United States Patent
Yu

(10) Patent No.: US 11,377,831 B2
(45) Date of Patent: Jul. 5, 2022

(54) FLUSH-MOUNTED SINK ASSEMBLY

(71) Applicant: MILA INTERNATIONAL INC., Huntington Beach, CA (US)

(72) Inventor: Shujen Yu, Huntinghton Beach, CA (US)

(73) Assignee: Mila International Inc., Huntington Beach, CA (US)

( * ) Notice: Subject to any disclaimer, the term of this patent is extended or adjusted under 35 U.S.C. 154(b) by 0 days.

(21) Appl. No.: 16/973,381

(22) PCT Filed: Jun. 12, 2018

(86) PCT No.: PCT/US2018/037072
§ 371 (c)(1),
(2) Date: Dec. 8, 2020

(87) PCT Pub. No.: WO2019/240772
PCT Pub. Date: Dec. 19, 2019

(65) Prior Publication Data
US 2021/0246641 A1    Aug. 12, 2021

(51) Int. Cl.
*E03C 1/33* (2006.01)
*E03C 1/18* (2006.01)
(52) U.S. Cl.
CPC .............. *E03C 1/335* (2013.01); *E03C 1/18* (2013.01)
(58) Field of Classification Search
CPC ............ E03C 1/335; E03C 1/33; A47B 77/06
See application file for complete search history.

(56) References Cited

U.S. PATENT DOCUMENTS

| | | | | |
|---|---|---|---|---|
| 2,440,741 A | * | 5/1948 | Drain | E03C 1/335 4/660 |
| 2,582,463 A | * | 1/1952 | Skinner | E03C 1/33 4/633 |
| 2,991,483 A | * | 7/1961 | Thost | E03C 1/33 4/650 |
| 8,356,367 B2 | | 1/2013 | Flynn | |
| 9,758,954 B1 | | 9/2017 | Peay | |
| 2007/0190307 A1 | | 8/2007 | Li et al. | |
| 2012/0261533 A1 | | 10/2012 | Laera | |
| 2018/0142453 A1 | * | 5/2018 | Hocaoglu | E03C 1/335 |

FOREIGN PATENT DOCUMENTS

| DE | 4041586 C1 | 10/1991 |
|---|---|---|
| EP | 0531590 A1 | 3/1993 |

OTHER PUBLICATIONS

International Search Report and Written Opinion of the International Searching Authority issued in PCT/US2018/037072, dated Sep. 14, 2018; ISA/US.

* cited by examiner

*Primary Examiner* — Janie M Loeppke
(74) *Attorney, Agent, or Firm* — Harness, Dickey & Pierce, P.L.C.

(57) ABSTRACT

In an implementation, a sink assembly is disclosed. The sink assembly includes a flush-mounted sink assembly including a substrate including a basin portion and a flange portion extending its entirety along a single plane, a mounting bracket configured to be secured to a countertop, and a support structure configured to be disposed over the mounting bracket and interface with the flange portion when installed within a countertop cutout.

20 Claims, 7 Drawing Sheets

FLUSH-MOUNTED SINK ASSEMBLY

CROSS REFERENCE TO RELATED APPLICATIONS

This application is a U.S. National Phase Application under 35 U.S.C. 371 of International Application No. PCT/US2018/037072 filed on Jun. 12, 2018. The entire disclosure of the above application is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a sink assembly, and more particularly to a flush-mounted sink assembly having a support structure.

Sinks for kitchens, bathrooms, and other facilities come in an array of designs and styles. Countertops and sinks are important architectural features of the facility. Typically, sinks can be mounted in one of three methods, drop-in, under-mount, and flush-mount. However, conventional sink manufacturing methods have inherent limitations in flush-mounted configurations. For instance, the thickness of the sink rims (e.g., the flanges) may be much larger with respect to the thickness of the basins to prevent deformation of the sink rims when installed. As such, the sink rims must be formed from disparate materials with respect to the basins and then welded together, which results in additional construction requirements.

SUMMARY

In an implementation, a sink assembly is disclosed. The sink assembly includes a flush-mounted sink assembly including a substrate including a basin portion and a flange portion extending its entirety along a single plane, a mounting bracket configured to be secured to a countertop, and a support structure configured to be disposed over the mounting bracket and interface with the flange portion when installed within a countertop cutout.

In other features, the support structure comprises an elongated structure.

In other features, the support structure extends along an entirety of at least one side of the countertop cutout.

In other features, the substrate comprises a unitary sheet of metal.

In other features, a ratio of a thickness of the flange portion to a thickness of the support structure ranges from 1:6.35 to 5:38.1.

In other features, the support structure comprises at least one of brass, stainless steel, or aluminum.

In other features, a thickness of the flange portion is equal to a thickness of the basin portion.

In other features, the sink assembly includes a plurality of adjustment fasteners configured to be adjustably coupled with the mounting bracket. Each one of the plurality of adjustment fasteners is vertically adjustable to support the support structure and peripheral mounting flange so that an upper surface of the peripheral mounting flange is flush with the countertop.

In an implementation, a sink assembly is disclosed. The sink assembly includes a flush-mounted sink assembly including a substrate including a basin portion and a flange portion extending its entirety along a single plane, and a thickness of the basin portion equals a thickness of the flange portion. The sink assembly also includes a mounting bracket configured to be secured to a countertop, a support structure configured to be disposed over the mounting bracket and interface with the flange portion when installed within a countertop cutout, and a plurality of adjustment fasteners configured to be adjustably coupled with the mounting bracket. Each one of the plurality of adjustment fasteners is vertically adjustable to support the support structure and peripheral mounting flange so that an upper surface of the peripheral mounting flange is flush with the countertop.

In other features, the support structure comprises an elongated structure.

In other features, the support structure extends along an entirety of a corresponding side of the countertop cutout.

In other features, the substrate comprises a unitary sheet of metal.

In other features, the unitary sheet of metal comprises at least one of titanium or stainless steel.

In other features, the support structure comprises at least one of brass, stainless steel, or aluminum.

In other features, a ratio of a thickness of the flange portion to a thickness of the support structure ranges from 1:6.35 to 5:38.1.

In an example implementation, a sink assembly is disclosed. The sink assembly includes a flush-mounted sink assembly including a unitary sheet of metal formed to include a basin portion and a flange portion extending its entirety along a single plane. The sink assembly also includes a mounting bracket configured to be secured to a countertop and an elongated support structure configured to be disposed over the mounting bracket and interface with the flange portion when installed within a countertop cutout.

In other features, the support structure extends along an entirety of a corresponding side of the countertop cutout.

In other features, the unitary sheet of metal comprises at least one of titanium or stainless steel.

In other features, the elongated support structure comprises at least one of brass, stainless steel, or aluminum.

In other features, a ratio of a thickness of the flange portion to a thickness of the support structure ranges from 1:6.35 to 5:38.1.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

When installed within a countertop cutout, flush-mounted sinks provide a visually harmonious transition between the flush-mounted sink and the countertop. As described herein, a flush-mounted sink assembly can include a basin portion and a flange portion. The flush-mounted sink assembly is configured to be received within the countertop cutout. The flush-mounted sink assembly is installed using a mounting assembly, which includes a one or more fasteners, mounting brackets, and support structures that mitigate deformation of the flange portion.

Figure 1:
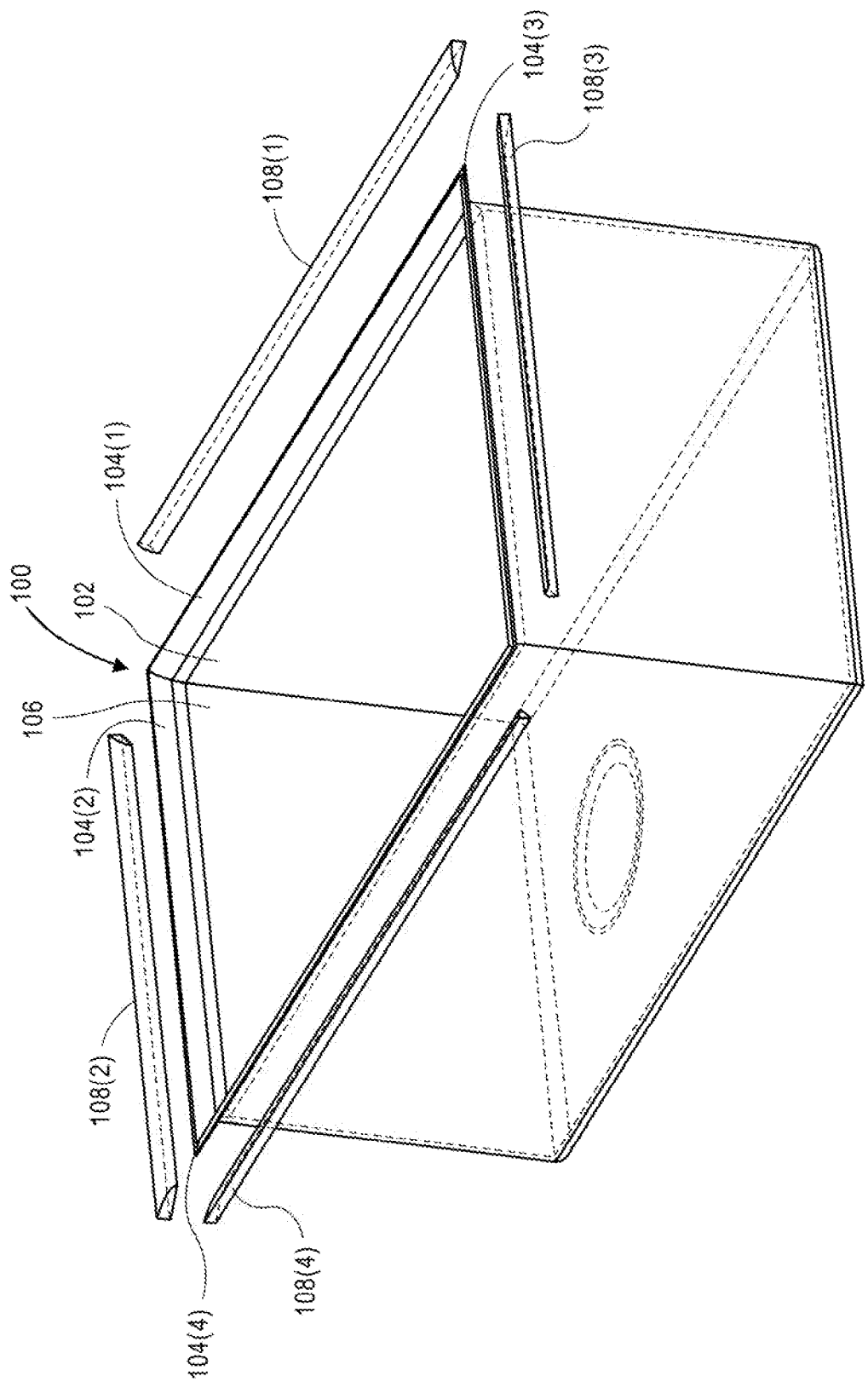
FIG. 1 is an exploded view of a sink assembly in accordance with an example implementation of the present disclosure.
Figure 2:
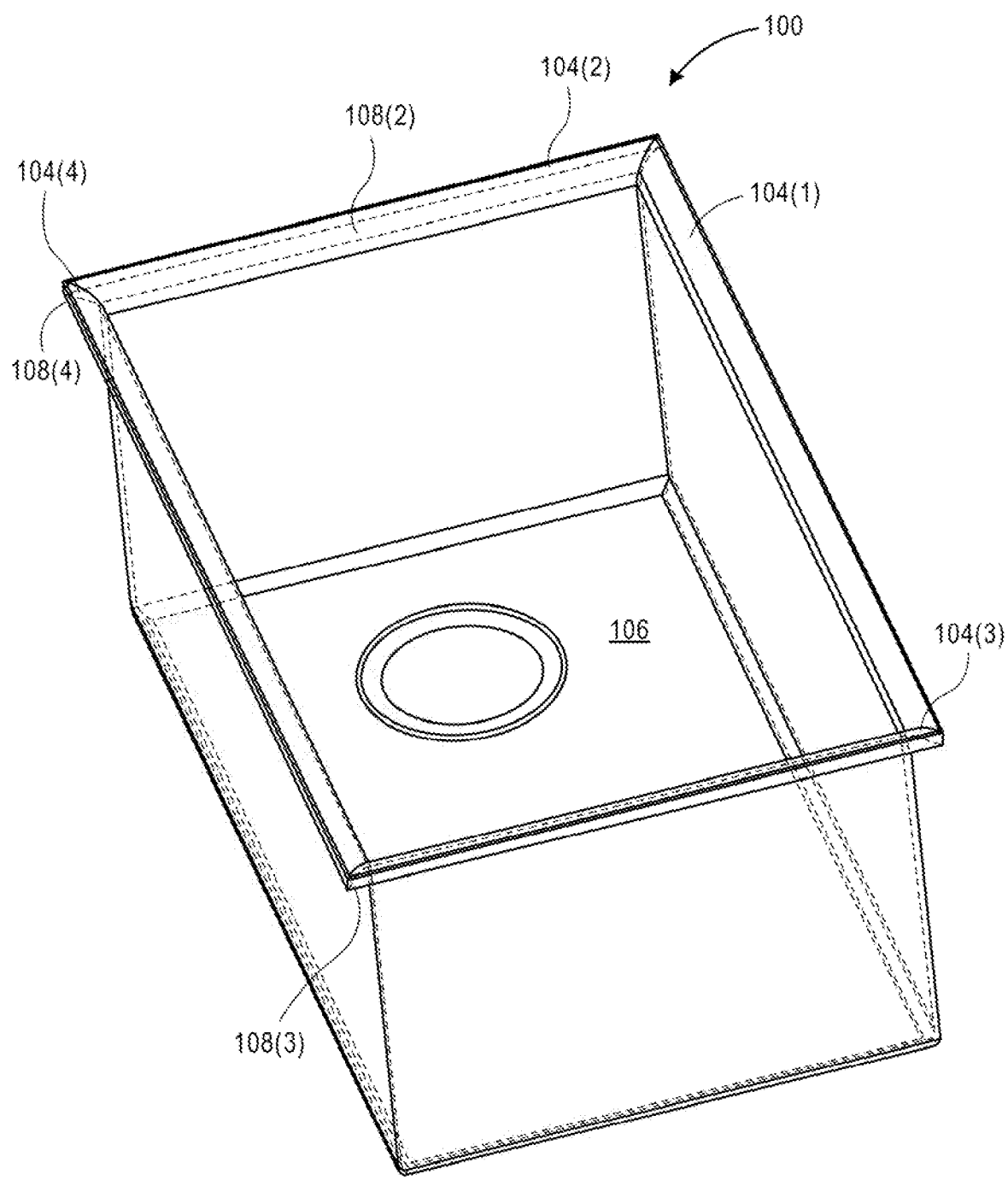
FIG. 2 is an isometric view of the sink assembly in accordance with an example implementation of the present disclosure.

FIGS. 1 through 2 illustrate an example sink assembly 100 according to an example implementation of the present disclosure. As shown, the sink assembly 100 includes a substrate 102 having a flange portion 104 and a basin portion 106. It is understood that the sink assembly 100 includes multiple flange portions 104. For example, flange portions 104(1) through 104(4) are illustrated in FIGS. 1 and 2. The sink assembly 100 also includes one or more support structures 108. Support structures 108(1)-108(4) are illustrated in FIG. 1. In this implementation, each support structures 108(1)-108(4) comprises a length that corresponds to the length of the corresponding flange portions 104(1)-104(4) to provide adequate support to the corresponding flange portion. For example, the support structures 108 are positioned to interface with respective flange portions 104 to mitigate deformation of the flange portions 104 when the sink assembly 100 is installed in a flush-mounted state. The sink assembly 100 is installed within a countertop 112 in a flush-mounted configuration as illustrated in FIGS. 3 through 8. For instance, the vertical exterior edge of the flange portion 104 is not visible when installed such that the exposed surface of the flange portion 104 and the exposed surface of the countertop 112 are in the same plane.

As used herein, basin may refer to a basin-like, water impervious repository that facilitates the collection of liquids, solids, and the like. It is to be understood and within the scope of this disclosure that a basin may comprise many shapes and sizes in various embodiments. By way of illustration, but not limitation, a basin may be a single basin, a double basin, a triple basin and the like.

The substrate 102 may be formed from any suitable material. For example, the substrate 102 may be a metal sheet comprised of copper, bronze, brass, titanium, stainless steel, combinations thereof, or the like. In an example implementation, the substrate 102 comprises a metal sheet having a thickness ranging from about 0.5 millimeters (0.019685 inches) to about 2.5 millimeters (0.0984252 inches). In some implementations, the substrate 102 may comprise sheet metal having a gauge ranging from 14 gauge to 26 gauge.

Figure 3:
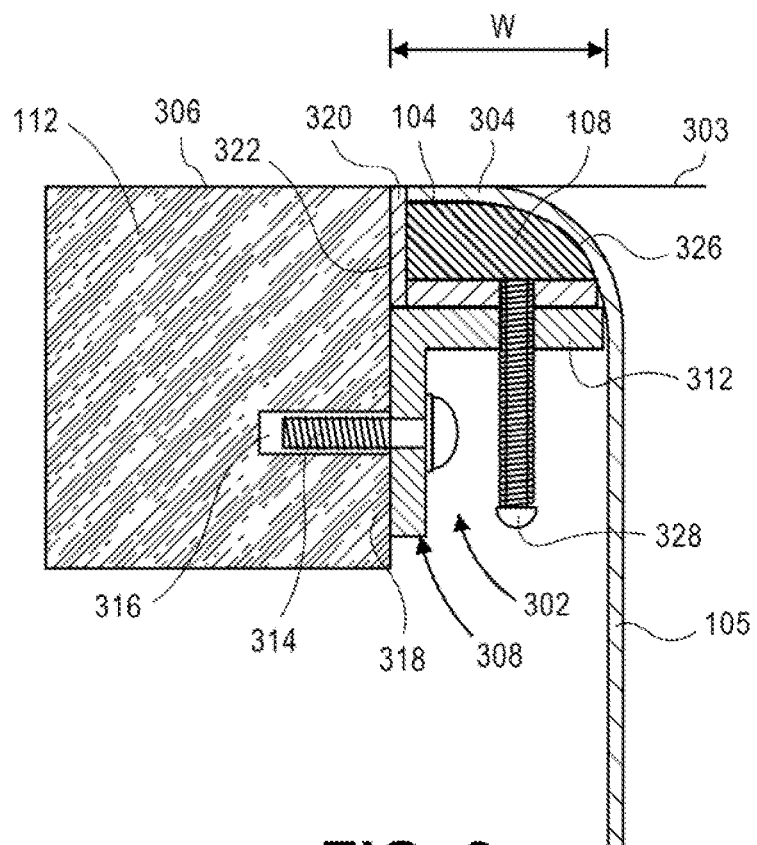
FIG. 3 is cross-sectional view of the sink assembly in accordance with an example implementation of the present disclosure.

Referring to FIG. 3, the sink assembly 100 is mounted within the countertop 112. The sink assembly 100 is mounted into the countertop 112 via a countertop cutout 302 defined within the countertop 112. The countertop 112 may comprise, but is not limited to, granite, laminate, marble, or the like.

In an example implementation, the substrate 102 comprises a single sheet (i.e., unitary piece) of suitable sink material. The substrate 102 may be machine pressed to form the flange portion 104 and the basin portion 106. The flange portion 104 includes an outwardly extending peripheral mounting flange that defines a plane 303 parallel to an exterior surface 304 of the extending peripheral mounting flange portion 104 and parallel to an exterior surface 306 of the countertop 112.

The sink assembly 100 also includes a mounting assembly 308 that includes a mounting bracket 312 and one or more anchoring fasteners 314. The anchoring fasteners 314 can be received by a receiving bore 316 to attach the mounting bracket 312 to the countertop 112. A suitable adhesive material, such as epoxy glue, can also be used to secure the mounting bracket 312 to the countertop 112. A gasket 320 is disposed over the mounting bracket 312 and a side portion 322 of the countertop 112. The gasket 320 may comprise any suitable material that expands to seal the interface between the sink assembly 100 and the countertop 112. For example, the material may comprise silicon, plastic, or the like. In some implementations, the mounting bracket 312 may comprise an angle mounting bracket. In some implementations, the mounting bracket 312 may comprise block mounting brackets. It is understood that any type of mounting bracket 312 may be used in accordance with the configuration of the sink assembly 100.

Figure 4:
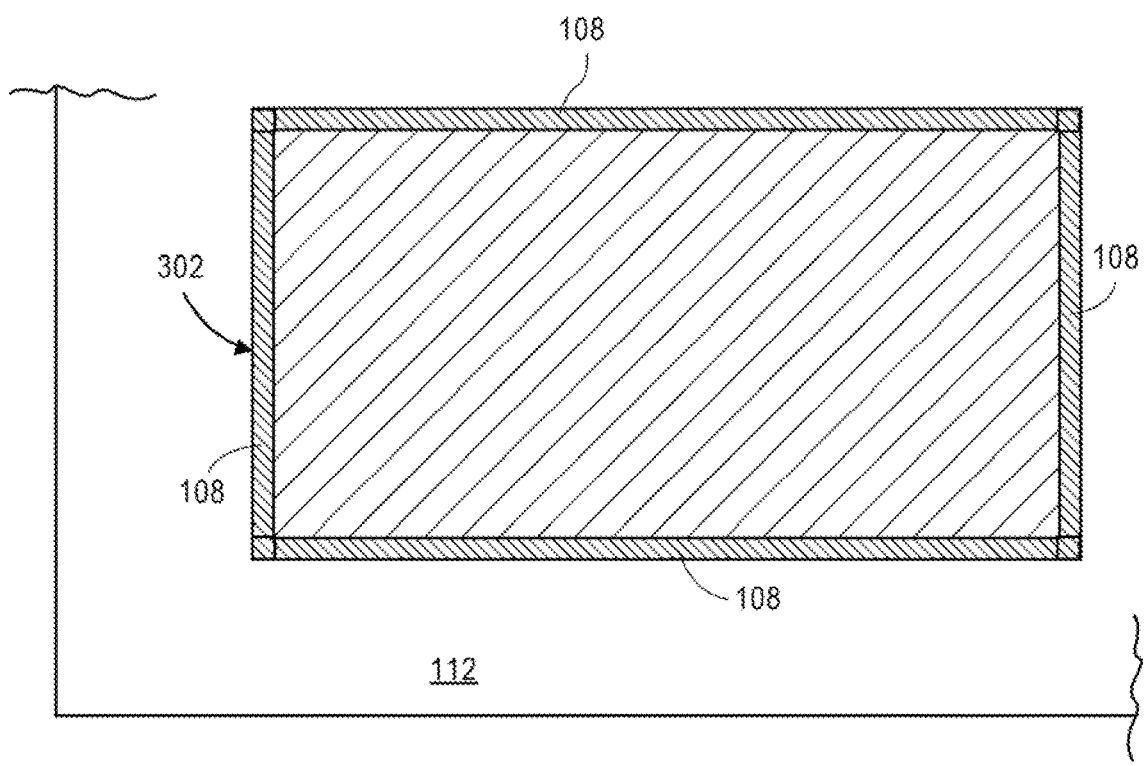
FIG. 4 is a plan view of a countertop defining a countertop cutout and multiple support structures disposed proximate to the countertop cutout in accordance with an example implementation of the present disclosure.
Figure 5:
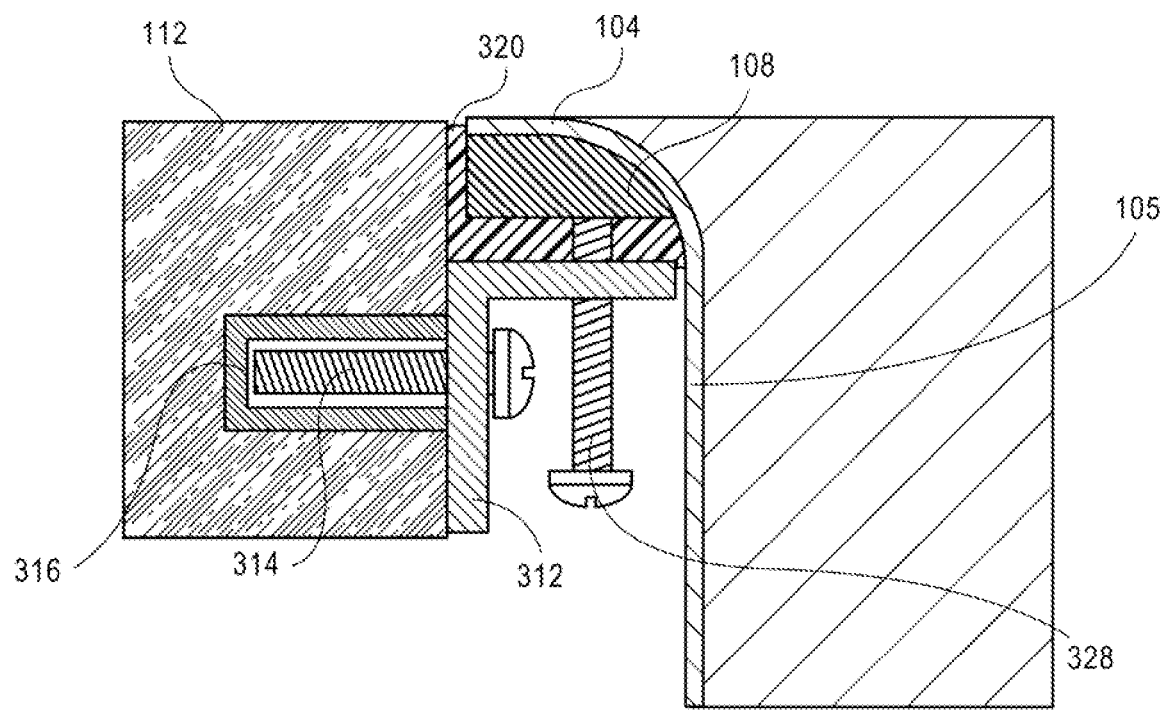
FIG. 5 is cross-sectional view of the sink assembly in accordance with another example implementation of the present disclosure.
Figure 6:
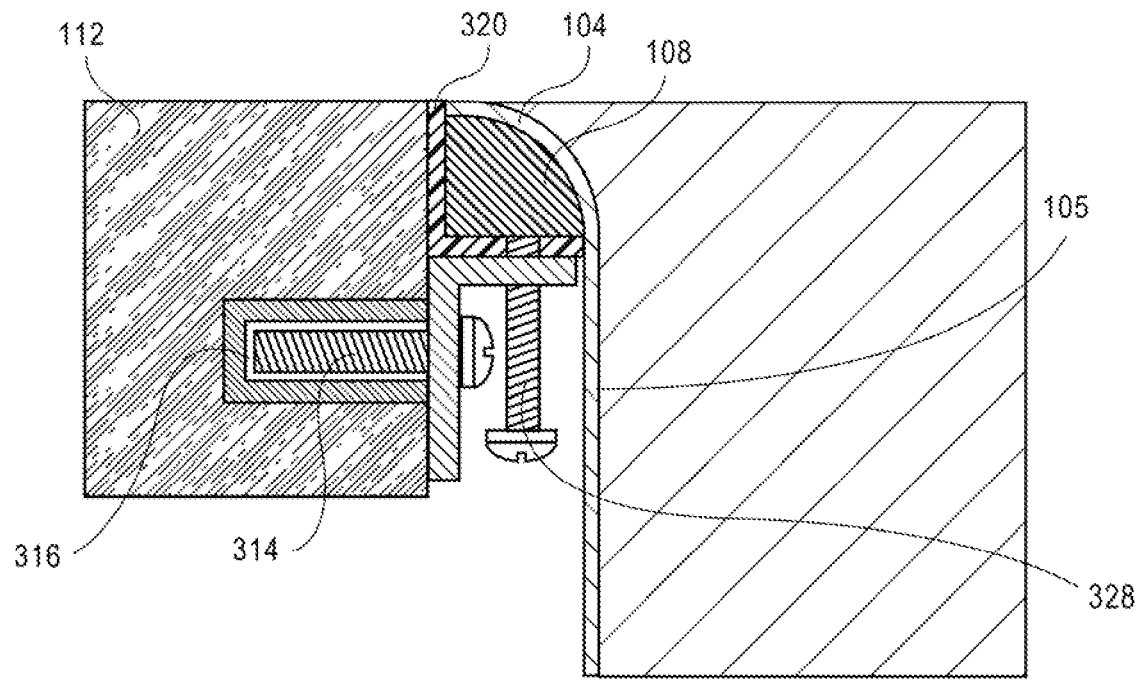
FIG. 6 is cross-sectional view of the sink assembly in accordance with another example implementation of the present disclosure.
Figure 7:
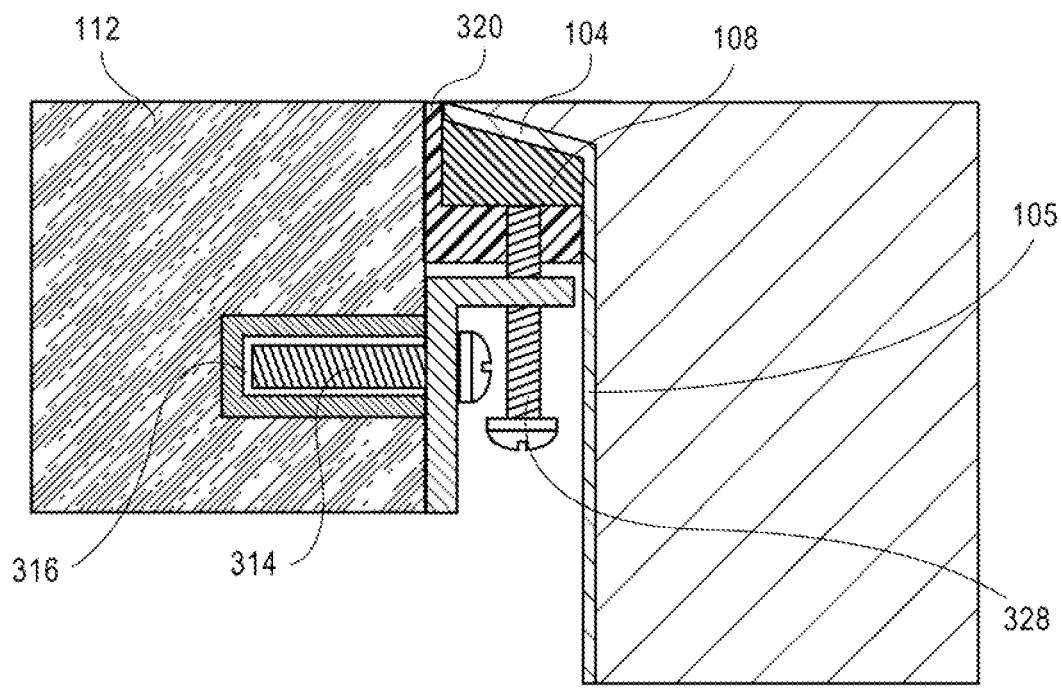
FIG. 7 is cross-sectional view of the sink assembly in accordance with another example implementation of the present disclosure.
Figure 8:
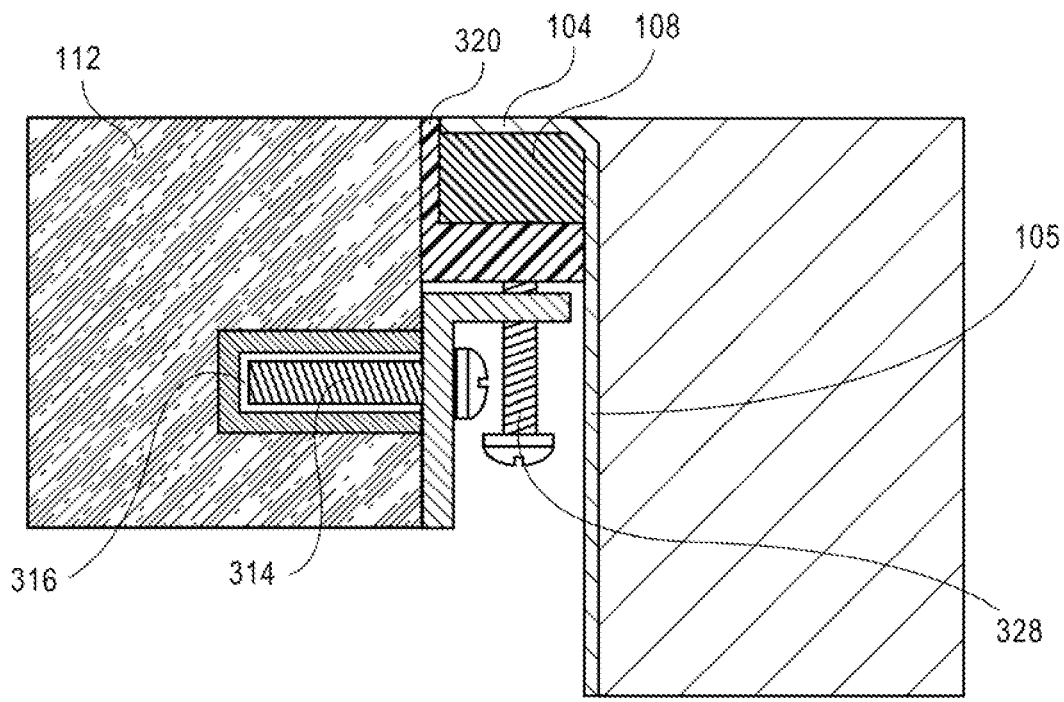
FIG. 8 is cross-sectional view of the sink assembly in accordance with another example implementation of the present disclosure.

The sink assembly 100 also includes a support structure 108 disposed over the gasket 320. For example, as shown in FIG. 4, the support structure 108 may comprise a discrete elongated structure that can extend the entirety of a corresponding side of the countertop cutout 302. Thus, the sink assembly 100 employs multiple support structures 108. The support structure 108 is configured to support the flange portion 104 to synergistically support the sink assembly 100 when installed. For instance, the support structure 108 mitigates deformation, such as bending, of the flange portion 104. For example, other sink assemblies having a similar flange thickness can result in deformation or bending of the flange when installed within the flush mounted configuration. Through utilizing the support structure 108, the flange portion 104 and the basin portion 106 can be formed from the same metal sheet to allow the flange portion 104 and the basin portion 106 to have the same thickness. In various implementations, the flange portion 104 may comprise the portion of the substrate 102 that interfaces with the support structure 108. Thus, by using a support structure 108, the flange portion and the basin portion 106 can be formed from the same substrate, which results in the flange portion 104 and the basin portion 106 having relatively the same thickness.

Referring to FIG. 3, an adhesive material may be applied over the support structure 108 and/or the flange portion 104 to bind the support structure 108 to the flange portion 104. The adhesive material may comprise an epoxy glue, or the like.

In various implementations, the support structure 108 may comprise a suitable metal material to provide sufficient support to the sink assembly 100. For example, the support structure 108 may be comprised of brass, stainless steel, aluminum, or the like. In example implementations, the thickness of the support structure 108 may range from 3.175 millimeters (0.125 inches) to about 19.05 millimeters (0.75 inches). In some specific implementations, the thickness of the support structure 108 may range from about 6.35 millimeters (0.25 inches) to about 19.05 millimeters (0.75 inches). In some implementations, a width (W) of the flange portion 104 may range from about 6.35 millimeters (0.25 inches) to about 50.8 millimeters (2 inches).

The thickness of the support structure 108 can be selected based upon the material of the substrate 102 and/or the thickness of the substrate 102 to mitigate deformation of the flange portion 104 when installed. For instance, by using the support structure 108, the thickness of the flange portion 104 can be the same of the thickness of the basin portion 106 and allows the flange portion 104 and the basin portion 106 to be constructed from a single sheet of metal. Otherwise, in other types of flush-mounted sinks, a thicker flange is required with respect to a thickness of the material. In these types of sinks, the flange is constructed from a metal material that differs with respect to the basin and then welded together. The support structure 108 may be formed through any suitable process. For example, the support structure 108 may be milled, extruded, or the like.

In order to prevent deformation of the flange portion 104, the ratio of the thickness of the flange portion 104 to the thickness of the support structure 108 may range from 1:6.35 to 5:38.1.

The sink assembly 100 may also include an adjustable fastener 328, such as adjustable leveling screws or the like, that is received through a bore defined within mounting bracket 312 and/or the gasket 320. The adjustable fasteners 328 are vertically adjustable to position the support structure 108 in the flush-mounted configuration. Referring generally to FIGS. 5 through 8 illustrate additional sink assemblies 100 according to various implementations. For example, FIGS. 5 through 8 illustrate various implementations of the flange portion 104.

Figure 9:
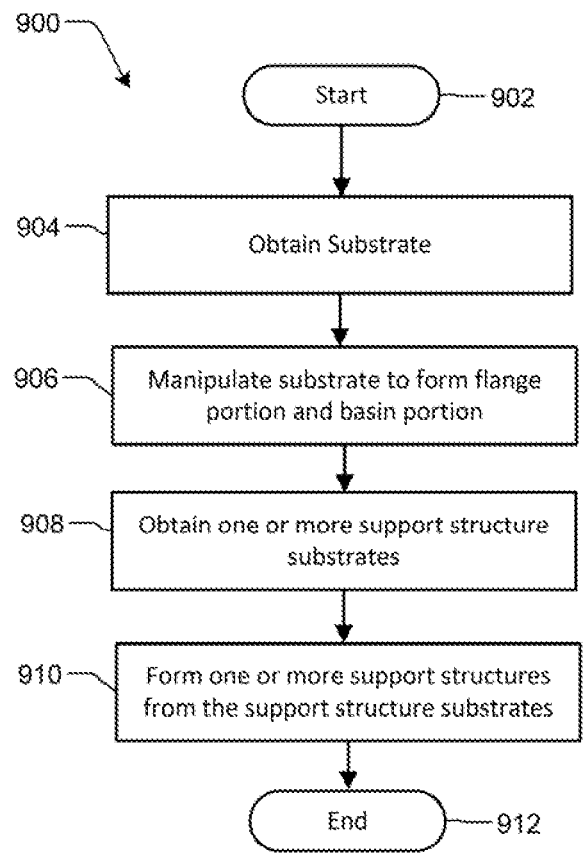
FIG. 9 is a flow diagram illustrating an example method for constructing a sink assembly in accordance with an example implementation of the present disclosure.

FIG. 9 illustrates a flow diagram of a method 900 for constructing a flush-mounted sink assembly, such as sink assembly 100. The method 900 begins at 902. At 904, a substrate 102 is obtained. For example, a single sheet of metal is obtained. At 906, the substrate 102 is manipulated to form the flange portion 104 and the basin portion 106. In an example implementation, the substrate 102 is machine pressed to form a sink. One or more drain openings can be formed within the basin portion 106.

At 908, one or more support structure substrates are obtained. One or more support structures 108 are formed from the support structure substrates at 910. For example, the support structure substrates may be milled to form the support structures 108. In another example, the support structure substrates can be extruded to form the support structures 108. The method 900 ends at 912.

Figure 10:
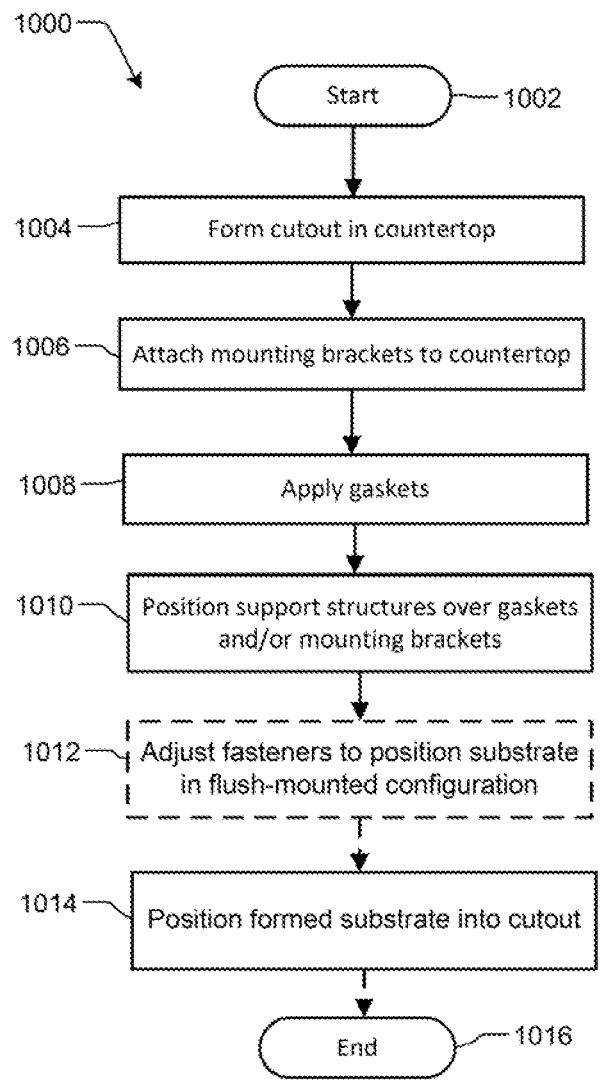
FIG. 10 is a flow diagram illustrating an example method for installing the sink assembly in accordance with an example implementation of the present disclosure.

FIG. 10 illustrates an example method 1000 for installing a flush-mounted sink assembly, such as sink assembly 100. The method 1000 begins at 1002. At 1004, a cutout is formed within a countertop, such as countertop 112. One or more mounting brackets 312 are attached to side surfaces of the countertop 112 at 1006. At 1008, one or more gaskets 320 are applied to the mounting brackets 312, the side surfaces of the countertop 112, and/or the flange portion 104. For example, a suitable coating process may be used to apply silicon to the mounting brackets 312 and/or the countertop 112. Additionally, the silicon can be applied to the underside of the flange portion 104 to allow better contact and/or adhesion with the mounting bracket 312.

At 1010, one or more support structures 108 are positioned over a corresponding gasket 320 and/or corresponding mounting bracket 312. In an example implementation, an adhesive material 326 can be applied to the flange portion 104, the gasket 320, and/or mounting bracket 312 to bind the flange portion 104, the gasket 320, and/or mounting bracket 312. At 1012, adjustable fasteners 328 are vertically adjusted to position the substrate 102 in the flush-mounted configuration. At 1014, the formed substrate 102 including the flange portion 104 and the basin portion 106 are positioned within the cutout such that the flange portion 104 is supported by the support structure 108. The method 1000 ends at 1016.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A sink assembly comprising:
   a flush-mounted sink assembly comprising a substrate including a basin portion and a flange portion extending around an entirety of the basin portion along a single plane; and
   a mounting bracket configured to be secured to a countertop, the mounting bracket having a mounting flange portion and a support flange portion extending substantially perpendicular to the mounting flange portion, the mounting flange portion having a plurality of apertures for receiving mounting fasteners therethrough and the support flange portion having a plurality of threaded apertures for receiving adjustable leveling screws therethrough; and
   a rigid support structure configured to be disposed over the support flange portion of the mounting bracket and supported on a tip of the adjustable leveling screws, the rigid support structure configured to interface with a bottom surface of the flange portion when installed within a countertop cutout.

2. The sink assembly as recited in claim 1, wherein the rigid support structure comprises a plurality of elongated members.

3. The sink assembly as recited in claim 2, wherein the plurality of elongated members extend along an entirety of at least two sides of the countertop cutout.

4. The sink assembly as recited in claim 1, wherein the substrate comprises a unitary sheet of metal.

5. A sink assembly comprising:
   a flush-mounted sink assembly comprising a substrate including a basin portion and a flange portion extending around an entirety of the basin portion along a single plane; and
   a mounting bracket configured to be secured to a countertop; and
   a support structure configured to be disposed over the mounting bracket and interface with a bottom surface of the flange portion when installed within a countertop cutout, wherein a ratio of a thickness of the flange portion to a thickness of the support structure ranges from 1:6.35 to 5:38.1.

6. The sink assembly as recited in claim 1, wherein the rigid support structure comprises at least one of brass, stainless steel, and aluminum.

7. The sink assembly as recited in claim 1, wherein a thickness of the flange portion is equal to a thickness of the basin portion.

8. The sink assembly as recited in claim 1, wherein each one of the plurality of adjustable leveling screws are configured to be vertically adjustable to support the rigid support structure and the flange portion so that an upper surface of the flange portion is flush with a top surface of a countertop.

9. A sink assembly comprising:
   a flush-mounted sink assembly comprising a substrate including a basin portion and a flange portion extending around an entirety of the basin portion along a single plane, wherein a thickness of the basin portion equals a thickness of the flange portion;
   a mounting bracket configured to be secured to a countertop, the mounting bracket having a mounting flange portion and a support flange portion extending substantially perpendicular to the mounting flange portion, the mounting flange portion having a plurality of apertures for receiving mounting fasteners therethrough and the support flange portion having a plurality of threaded apertures for receiving adjustable leveling screws therethrough;
   a rigid support structure configured to be disposed over the support flange of the mounting bracket and supported on a tip of the adjustable leveling screws, the rigid support configured to interface with a bottom surface of the flange portion when installed within a countertop cutout; and
   a plurality of adjustable leveling screws configured to support the rigid support structure and flange portion so that an upper surface of the flange portion is flush with the countertop.

10. The sink assembly as recited in claim 9, wherein the rigid support structure comprises a plurality of elongated members.

11. The sink assembly as recited in claim 10, wherein the plurality of elongated members extend along an entirety of at least two sides of the countertop cutout.

12. The sink assembly as recited in claim 9, wherein the substrate comprises a unitary sheet of metal.

13. The sink assembly as recited in claim 12, wherein the unitary sheet of metal comprises at least one of titanium and stainless steel.

14. The sink assembly as recited in claim 9, wherein the rigid support structure comprises at least one of brass, stainless steel, and aluminum.

15. A sink assembly comprising:
   a flush-mounted sink assembly comprising a substrate including a basin portion and a flange portion extending its entirety along a single plane, wherein a thickness of the basin portion equals a thickness of the flange portion;
   a mounting bracket configured to be secured to a countertop;
   a support structure configured to be disposed over the mounting bracket and interface with the flange portion when installed within a countertop cutout; and
   a plurality of adjustment fasteners configured to be adjustably coupled with the mounting bracket, each one of the plurality of adjustment fasteners vertically adjustable to support the support structure and peripheral mounting flange so that an upper surface of the peripheral mounting flange is flush with the countertop, wherein a ratio of a thickness of the flange portion to a thickness of the support structure ranges from 1:6.35 to 5:38.1.

16. A sink assembly comprising:
   a flush-mounted sink assembly comprising a unitary sheet of metal formed to include a basin portion and a flange portion extending around an entirety of the basin portion along a single plane;
   a mounting bracket configured to be secured to a side surface of a cutout within a countertop, the mounting bracket having a plurality of threaded apertures for receiving adjustable leveling screws therethrough; and
   a plurality of rigid elongated support members configured to be disposed over the mounting bracket and supported on a tip of the adjustable leveling screws, the rigid support structure configured to interface with a bottom surface of the flange portion when installed within a countertop cutout.

17. The sink assembly as recited in claim 16, wherein the plurality of rigid elongated support members extend along an entirety of a corresponding side of the countertop cutout.

18. The sink assembly as recited in claim 16, wherein the unitary sheet of metal comprises at least one of titanium and stainless steel.

19. The sink assembly as recited in claim 16, wherein the plurality of rigid elongated support members comprises at least one of brass, stainless steel, and aluminum.

20. A sink assembly comprising:
   a flush-mounted sink assembly comprising a unitary sheet of metal formed to include a basin portion and a flange portion extending its entirety along a single plane;
   a mounting bracket configured to be secured to a countertop; and
   an elongated support structure configured to be disposed over the mounting bracket and interface with the flange portion when installed within a countertop cutout, wherein a ratio of a thickness of the flange portion to a thickness of the support structure ranges from 1:6.35 to 5:38.1.

\* \* \* \* \*